United States Patent

[11] 3,564,117

| [72] | Inventors | Ernst Scheffler<br>Langenhagen;<br>Jurgen W. Luhring, Hannover, Germany |
|---|---|---|
| [21] | Appl. No. | 799,636 |
| [22] | Filed | Feb. 17, 1969 |
| [45] | Patented | Feb. 16, 1971 |
| [73] | Assignee | Kabel-und Metallwerke Gutehoffnung-<br>shutte Aktiengesellschaft<br>Hannover, Germany |
| [32] | Priority | Feb. 20, 1968 |
| [33] | | Germany |
| [31] | | K60326/21C |

[54] CABLE SPLICE CONSTRUCTION
5 Claims, 3 Drawing Figs.

[52] U.S. Cl.................................................. 174/89;
174/75; 339/14; 174/78; 174/88

[51] Int. Cl.................................................... H02g 15/08
[50] Field of Search........................................... 174/75.2,
78, 88.2, 89, 74, 84; 339/(Inquired), 14, 177;
174/38, 21, 21.3

[56] References Cited
UNITED STATES PATENTS

| 2,798,113 | 7/1957 | Koller et al. ................... | 174/75(.2) |
| 3,435,126 | 3/1969 | Hamilton....................... | 174/89X |

*Primary Examiner*—Darrell L. Clay
*Attorney*—Philip G. Hilbert

ABSTRACT: A splice construction for electrical cables, particularly communication cables having a thin metallic sheathing carrying an outer layer of synthetic plastic, wherein the terminal portions of the metallic sheathing of a pair of cables to be spliced, is treated in a manner to facilitate their electrical interconnection yet leaving the cable cores unimpaired.

PATENTED FEB 16 1971   3,564,117

INVENTORS
Ernst Scheffler
Jurgen Luhring
BY
ATTORNEY

CABLE SPLICE CONSTRUCTION

BACKGROUND OF THE INVENTION

Electrical cables, and more particularly communications cables are known, which have a thin metal outer sheathing; the outer surface of such sheathing being covered with an adherent layer of plastic. This type of cable presents a problem when a pair of such cables are to be spliced, or a terminal connection of a single cable is made at a splicing box or in multiple cable joints.

Since the splicing operation includes making an electrical connection between the metal sheathing portions of the cables to be spliced; portions of the plastic layer must be removed to expose the metal surface of the sheathing. Such plastic layers are highly adherent to the metal sheathing and mechanical removal of the plastic layer is quite difficult as the same must be accomplished without injury to the metal sheathing or the cable core. Thus, heat can not be used to remove the plastic layer, as this may injure the cable core.

Further, even when the metal sheathing is exposed by careful removal of the plastic layer; making the electrical connections presents difficulties since the use of conventional clamping means applied to the metal sheathing at the terminal ends of the cables may damage the cable core through the applied clamping pressure and when soldering the electrical connection link, cable insulation may be damaged by the heat of the soldering operation.

Accordingly, an object of this invention is to provide improved splicing procedures for cables having thin metal sheathing carrying an outer layer of plastic; wherein the inner surface of the metal sheathing at terminal portions of the cables, which is free of plastic covering, is brought into an accessible position and without removing any plastic covering, so as to allow for electrical connection of the thus exposed inner surface portions of the metal sheathing.

Another object of this invention is to provide a cable splice of the character described, wherein, the terminal portions of the composite metal sheathing and plastic layer is slit longitudinally to provide a plurality of tab portions which may be folded back to expose the inner surface of the metal sheathing portions thereof.

A further object of this invention is to provide a cable splice of the character described, wherein suitable means is disposed between the turned-back tab portions and the opposed portions of the composite sheathing and plastic layer, to act as a barrier against the transmission of excessive clamping forces or heat, which otherwise may adversely affect the cable core or the insulation thereof.

Still another object of this invention is to provide a splicing construction for cables wherein the splicing operation is simplified and may be carried out speedily and in an efficient manner.

Other objects of this invention will in part be obvious and in part hereinafter pointed out.

DESCRIPTION OF THE PREFERRED EMBODIMENTS

Figure 1:
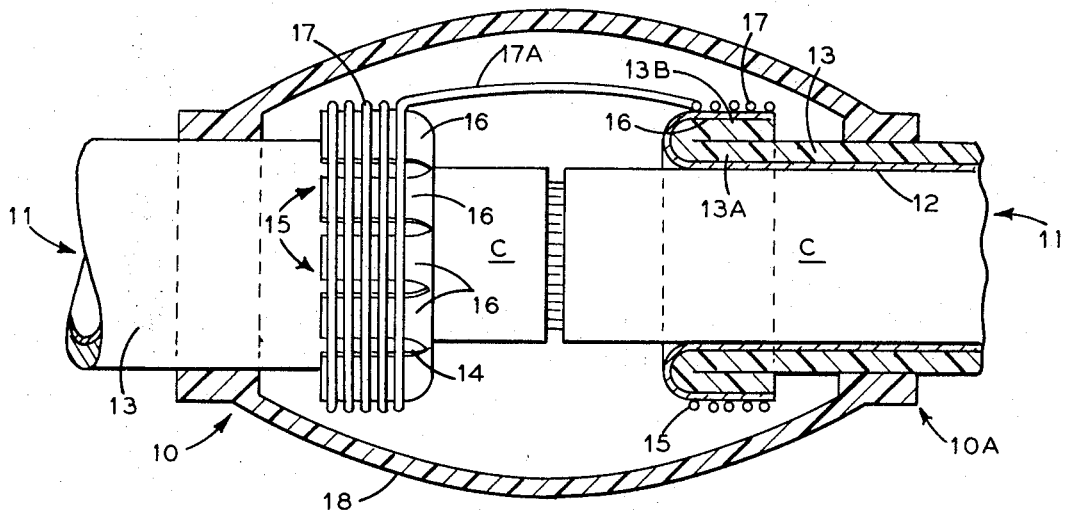
FIG. 1 is a longitudinal view, with parts in section, showing a cable splicing construction embodying the invention.

As shown in FIG. 1, a pair of cables, such as communications cables, which are to be spliced, is indicated at 10, 10A. Each cable comprises the usual core C which is enclosed in a covering 11. Covering 11 is a composite of an inner, thin layer of metal 12 and an outer cover layer 13 of a suitable plastic, such as polyethylene or the like, which is tightly adherent to the outer surface of metal layer 12.

It is understood that the conductors of cores C of cables 10, 10A, not shown, are spliced in a conventional manner. Terminal portions of the composite covering 11 on cables 10, 10A, are slit longitudinally as at 14 to provide a series of circumferentially disposed tabs 15.

Tabs 15 are then turned back on themselves to expose the undersurface portions 16 of metal layer 12; said metal surface portions 16 now being in an uppermost, accessible position. The tabs 15 are held in their folded back position by a winding 17 of wire, which winding may be in electrical contact with metal surface 16 and a wire portion 17A may electrically interconnect windings 17 on cables 10, 10A. The windings 17 may be soldered to the metal surface portions 16; the doubled plastic layer portions 13A, 13B acting as barriers to the transmission of the excessive heat, to thereby avoid injury of the insulated conductors of cores C.

A split casing 18 of synthetic plastic may be used to enclose the spliced joint of cables 10, 10A; the casing sections being suitably adhered to the plastic layer 13 of said cables.

Figure 2:
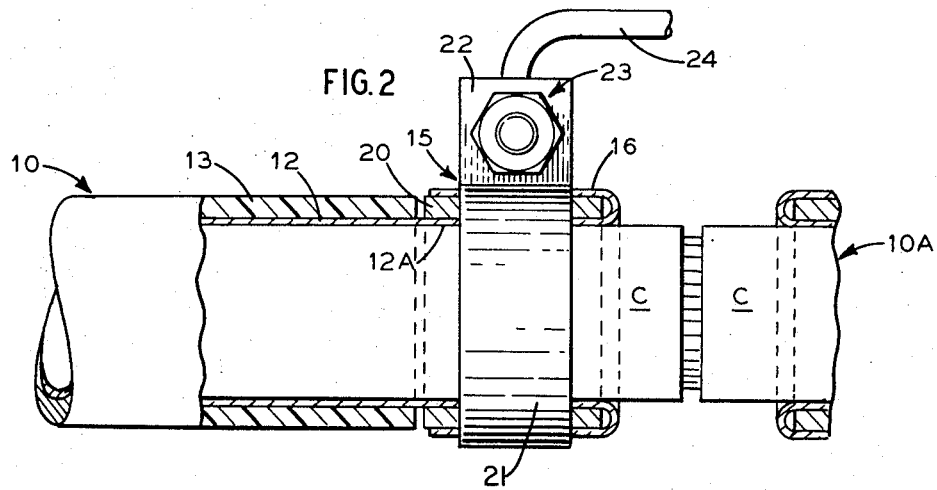
FIG. 2 is a view similar to that of FIG. 1, showing another embodiment of the invention.

The electrical interconnection of tabs 15 on cables 10, 10A, may be made as shown in FIG. 2, wherein, the outer surface portions of the metal layers 12 have portions of the plastic layer 13 removed therefrom, before forming tabs 15, as described above. A metal ring 20 is slipped over the exposed metal surface portions 12A and the tabs 15 are then folded back over the outer surface of said ring 20.

Clamps 21 of a known construction engage the tabs 15 with the flanges 22 thereof secured by nuts and bolts as at 23. A conductor 24 electrically interconnects the clamps 21 on cables 10, 10A. It will be apparent that the rings 20 act as barrier means against the transmission of excessive clamping pressures, thereby avoiding possible injury to the cores C of the cables.

Figure 3:
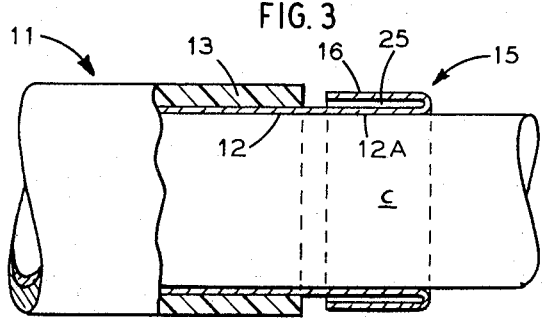
FIG. 3 is a view similar to that of FIG. 2, showing a further embodiment of the invention.

Also, as shown in FIG. 3, the terminal end portions 12A of metal layer 12 which are free of plastic covering 13, may be slit to form tabs 15 which are turned back on themselves, as described above, leaving a small air space 25 therebetween. This provides a degree of heat insulation to protect the cable core C when soldering operations are conducted to secure a bridging conductor to surface portions 16 of the tabs 15. Alternatively, ringlike members of selected material may be disposed in the air space 25, to provide heat and stress barriers.

We claim:

1. A splice construction for a pair of electrical cables in end to end relation, each cable having a core and a composite covering over said core, said covering comprising an inner layer of metal and an outer layer of thermoplastic resin, a terminal portion of said covering being longitudinally slit forming a plurality of circumferentially spaced, longitudinally extending tabs, said tabs being bent back disposing the metal layer portions thereof in an uppermost, bare condition, annular metal means in surface contact with said bare metal layer portions of said bent back tabs to retain said tabs in their bent back position and conductor means electrically interconnecting the annular metal means of one cable with the annular metal means of the other cable.

2. A splice construction as in claim 1 wherein the thermoplastic layer is removed from the terminal portions of said covering of each cable exposing opposite surface portions of said metal layer of each cable.

3. A splice construction as in claim 1 and further including a ring member disposed between said tabs and opposed portions of said covering.

4. A splice construction as in claim 1 wherein said annular metal means includes clamping means in engagement with the tabs on each cable, rigid means in opposed relation to the inner surface portions of said tabs for resisting compression by said clamping means.

5. A splice construction as in claim 1, wherein said annular metal means comprises a spiral coil of wire having its turns in contact with and extending transversely of said tabs, said conductor means comprising a wire portion interconnecting the spiral coil of wire of one cable with the spiral coil of wire of the other cable.